United States Patent [19]

Van Oost

[11] Patent Number: 4,627,654
[45] Date of Patent: Dec. 9, 1986

[54] ARTICULATED PARALLELOGRAM GRIPPER

[75] Inventor: Michel D. Van Oost, Marcoussis, France

[73] Assignees: Automobiles Citroen, Neuilly sur Seine; Automobiles Peugeot, Paris, both of France

[21] Appl. No.: 698,768

[22] Filed: Feb. 6, 1985

[30] Foreign Application Priority Data

Feb. 7, 1984 [FR] France ................. 84 02116

[51] Int. Cl.$^4$ ............................................. B66C 1/00
[52] U.S. Cl. ..................................... 294/106; 294/88; 294/86.4
[58] Field of Search ............ 294/106, 88, 87.24, 294/92, 110.1, 115, 86.4; 414/662, 591, 730

[56] References Cited

U.S. PATENT DOCUMENTS 4,368,913 1/1983 Brockmann et al. .......... 294/106

FOREIGN PATENT DOCUMENTS 642151 1/1979 U.S.S.R. ........................... 294/88
988546 1/1983 U.S.S.R. ........................... 414/591

Primary Examiner—James B. Marbert
Attorney, Agent, or Firm—Karl F. Ross; Herbert Dubno

[57] ABSTRACT

A gripper for fitting to a robot and adapted to grip circular work pieces or work pieces comprising a circular bore, comprising a support, articulated parallelograms which are disposed in planes converging towards an axis X—X and a first arm of which is mobile with respect to said support, parallel to said axis X—X, the opposite arm being mobile in a direction perpendicular to said axis but fixed in the direction of this latter, and having a clamping finger, and means carried by said support for moving the first arms of said parallelograms having said clamping fingers are provided with at least two rollers disposed on each side of said support, in contact with tracks provided thereon.

4 Claims, 6 Drawing Figures

4,627,654

ARTICULATED PARALLELOGRAM GRIPPER

FIELD OF THE INVENTION

The present invention relates to a gripper or gripping means fittable on a robot and adapted for gripping circular workpieces or workpieces comprising a circular bore.

BACKGROUND OF THE INVENTION

U.S. Pat. No. 3,051,327 describes a gripper of this kind comprising a support, articulated parallelograms which are disposed in planes converging towards an axis and a first arm of which is mobile with respect to the support parallel to this axis, the opposite arm being mobile in a direction perpendicular to said axis, but fixed in the direction of this latter, and having a clamping finger and means carried by the support for moving the first arm of the parallelogram.

When the first arms of the parallelograms are moved with respect to the support, the opposite arms move with their clamping finger towards or away from the axis of convergence of the parallelograms. In the first case, the fingers may grip a work piece to be transported disposed in this axis. In the second case, the fingers may grip a piece comprising a circular bore, by being engaged in this bore.

OBJECT OF THE INVENTION

It is the object of the present invention to provide a gripper of this type whose operation is particularly precise and reliable.

SUMMARY OF THE INVENTION

The gripper of the invention has the arms of the parallelograms carrying the clamping fingers provided with at least two rollers disposed on each side of the support, in contact with tracks provided thereon.

The gripper of the invention is particularly useful for transporting light and fragile work pieces, such as those used in the manufacture of electric motors. When the axis of convergence of the parallelograms is convertible and when the clamping fingers therefore move horizontally, it is easy to exert a sufficient clamping force so that the work piece does not slide vertically under the effect of its weight, without being excessive so as not to deform it.

By causing the support to undergo a translational and rotational movement by means of the robot, the gripped work piece is moved and oriented; it may be accurately placed on an assembly bench.

In a particular embodiment of the invention, the first arms of the parallelograms and the opposite arms carrying the clamping fingers are engaged in slits or windows in the support oriented towards the axis of convergence of the parallelograms.

The first arms of the parallelograms may be secured to the same control end piece connected to the support by means of an actuating cylinder disposed in the axis of convergence of the parallelograms.

The ends of the arms of the parallelograms carrying the clamping fingers are advantageously bevelled so as to meet up along the axis of convergence of the parallelograms. The angle of the bevel depends on the number of parallelograms; for example, in the case of three parallelograms, it is 120°.

BRIEF DESCRIPTION OF THE DRAWING

One embodiment of the gripper of the invention will be described hereafter, by way of non limitative example, with reference to the accompanying drawing in which.

SPECIFIC DESCRIPTION

Figure 1:
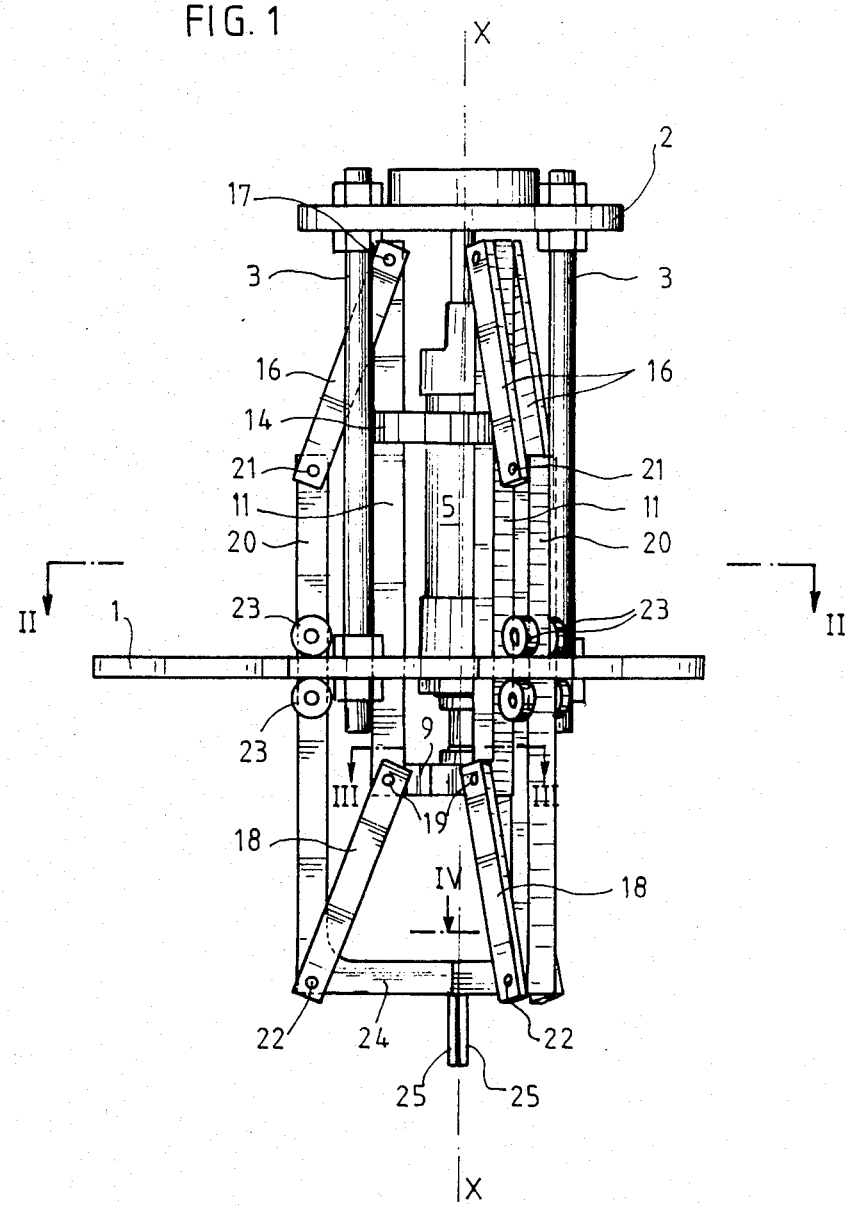
FIG. 1 is an elevational view of the gripper.
Figure 2:
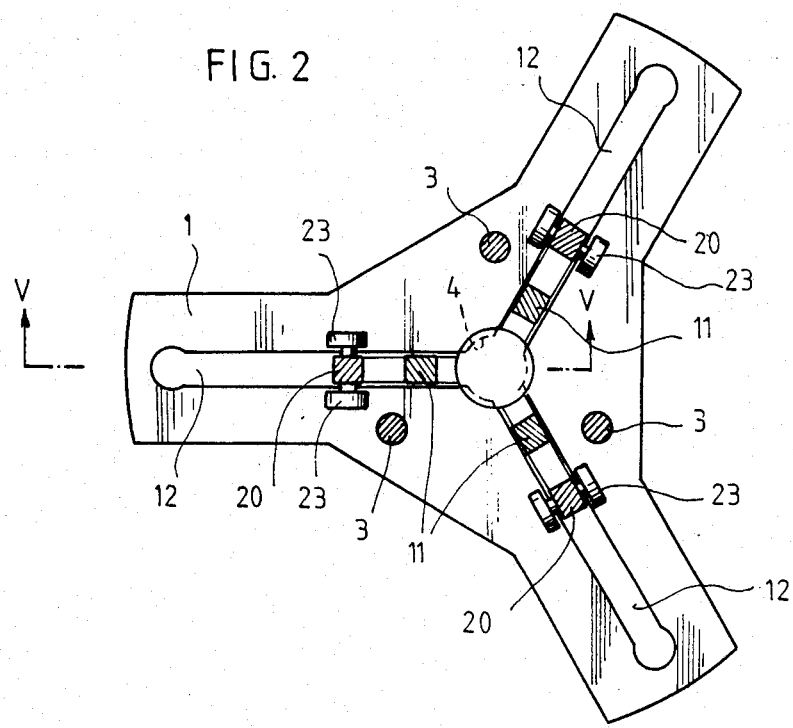
FIGS. 2 to 4 are horizontal sectional views respectively along II—II, III—III and IV—IV of FIG. 1.
Figure 3:
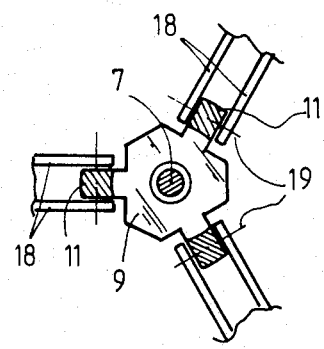

The gripper of the invention comprises a support plate 1 connected to an adapter 2 by means of three tie rods 3. Plate 1 comprises a central bore 4 in which a vertically disposed actuating cylinder 5 is fixed by a nut 6, rod 7 of its piston being directed downwards.

A controlled end piece 8 formed from a base 9 which has centrally therethrough a tapped hole 10 and three vertical arms 11 is fixed to rod 7 of the actuating cylinder, which rod is screwed into a hole 10. These arms pass through three radial slits 12 in the support plate 1 perpendicular to the axis and which are disposed at 120° with respect to each other and converge towards the axis X—X of the actuating cylinder, and in which the arms 11 may slide vertically. Each arm comprises a shoulder 13, at an intermediate point of its length; a ring 14 rests on the three shoulders 13 and is fixed to the arms (screws 15), this ring prevents the arms from vibrating.

The three arms 11 each belong to an articulated parallelogram disposed in a vertical plane passing through the axis X—X. Each of these parallelograms comprises, besides the corresponding arm 11, an arm 16 which is articulated at 17 to arm 11, an arm 18 which is articulated at 19 to this arm 11 and is parallel to arm 16 and arm 20 which is articulated at 21 and 22 to arms 16 and 18 and is parallel to arm 11. Arms 20 pass through the slits 12 in plate 1 and each carry four rollers 23 which may roll on tracks of plate 1 parallel to slits 12 and are disposed two on one side of the plate and two on the opposite side. The rollers 23 are journaled at fixed locations on the respective lines 20 of the respective parallelogram.

Thus it can be seen that when the rod 7 of the piston of the actuating cylinder 5 moves vertically while driving arms 11, arms 20 move horizontally while remaining parallel to themselves.

Figure 4:
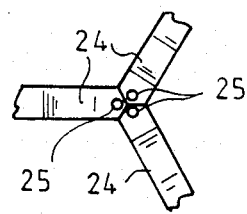
Figure 5:
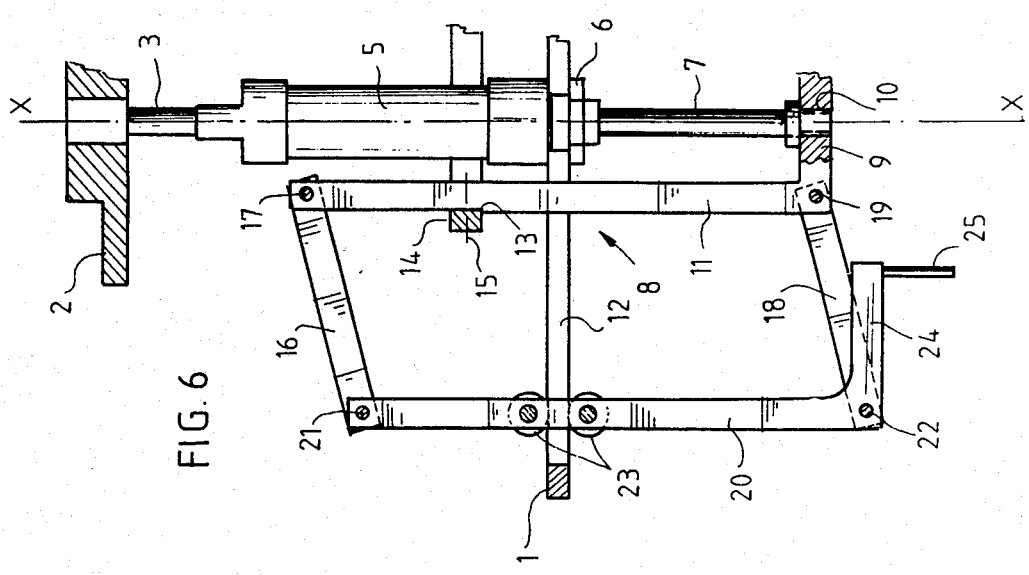
FIG. 5 is a vertical sectional view through V—V of FIG. 2.
Figure 6:
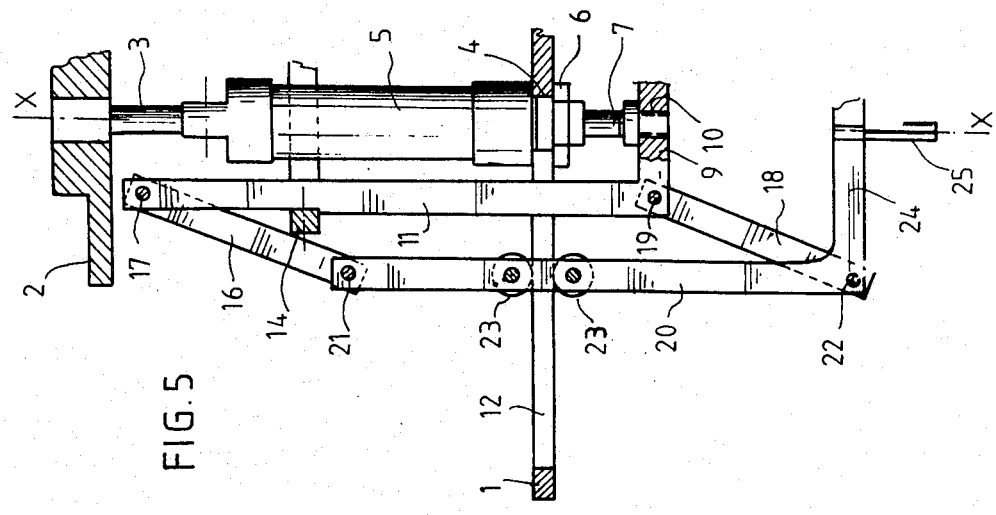
FIG. 6 is a view similar to FIG. 5, with the gripper released.

Each arm 20 (parallel to the axis) is extended at its lower end by a horizontal arm 24 whose end is bevelled at 120° so that the positions of the three arms 24 may meet up along the axis X—X of cylinders 6 (see FIG. 4). In the vicinity of this end, the arm has a vertical finger 25 (parallel to the axis) formed for example by a cylindrical rod force fitted in a clevis of the arm.

When cylinder 5 is actuated to move its piston upwardly, the points of the three arms 24 tend to meet up and the three fingers 25 draw closer for gripping an externally circular work piece.

Conversely, when cylinder 5 is actuated so that its piston moves downwardly from the topmost position, fingers 25 move away from each other for gripping a work piece comprising a circular bore.

What is claimed is:

1. A gripper for fitting to a robot and adapted for gripping a circular workpiece of a workpiece having a circular bore, said gripper comprising:

a support including a guide in a guide plane perpendicular to an axis and provided with a plurality of windows elongated in generally radial directions with respect to said axis and angularly spaced thereabout;

respective articulated parallelogrammatic linkages lying in respective axial planes and received in respective ones of said windows, each of said linkages including:

a first arm generally perpendicular to said guide plane and moveable substantially exclusively parallel to said guide plane, at least one pair of rollers journalled at fixed locations on said first arm and riding on said guide, a second arm parallel to said first arm and movable in the respective window generally perpendicular to said guide plane, respective links coupling said arms together, and a clamping finger on an end of said first arm and positioned to cooperate with the clamping fingers of the other parallelogrammatic linkages to grip a said workpiece; and actuating means coupled to said second arms and connected with said support for displacing said second arms generally perpendicular to said guide place to simultaneously cause said fingers to approach and recede from one another selectively.

2. A gripper as defined in claim 1 wherein said guide is a plate lying in said plane and said actuating means is a cylinder fixed to said plate, said second arms being provided with a connecting piece operatively connected to a piston of said cylinder, said cylinder and piston lying along said axis.

3. A gripper as defined in claim 1 wherein said fingers are beveled so as to meet along said axis when said fingers are approached to one another.

4. A gripper as defined in claim 2 wherein each of said first arms is provided with two pairs of rollers on opposite sides of said guide plate, the rollers of each pair straddling the respective first arm.

* * * * *